United States Patent [19]

Greenwood

[11] Patent Number: 4,669,892
[45] Date of Patent: Jun. 2, 1987

[54] THERMOMETER MOUNTING DEVICE

[75] Inventor: Victor D. Greenwood, Orange City, Iowa

[73] Assignee: K-Products, Inc., Orange City, Iowa

[21] Appl. No.: 835,640

[22] Filed: Mar. 3, 1986

[51] Int. Cl.$^4$ .............................................. G01K 1/14
[52] U.S. Cl. ................................ 374/194; 206/306; 206/805
[58] Field of Search ................ 374/194, 190; 206/306, 206/805

[56] References Cited

U.S. PATENT DOCUMENTS

| | | | |
|---|---|---|---|
| 2,878,673 | 3/1959 | Christensen | 374/141 |
| 3,161,058 | 12/1964 | Willinger et al. | 374/194 |
| 3,487,639 | 1/1970 | Berkowitz | 374/190 |
| 3,803,915 | 4/1974 | Chavey | 374/194 |
| 3,937,085 | 2/1976 | Harrison | 374/109 |
| 4,218,917 | 8/1980 | Stortz | 374/194 |

Primary Examiner—Daniel M. Yasich
Attorney, Agent, or Firm—Larson and Taylor

[57] ABSTRACT

An article of manufacture including a mounted glass thermometer has been developed which resists breakage of the glass thermometer tube. The thermometer tube is mounted on backing using flexible elastomeric rings which encircle the thermometer tube and two protrusions integral with and extending from said backing in the same plane as the backing.

7 Claims, 3 Drawing Figures

THERMOMETER MOUNTING DEVICE

BACKGROUND OF THE INVENTION

This invention relates to an article of manufacture comprised of a mounted glass thermometer which aids in preventing the breaking of the glass thermometer under certain conditions.

U.S. Pat. No. 3,937,085 (Harrison) discloses a thermometer and a generally elongate mount therefor. The thermometer is mounted using bands which encircle the thermometer, pass through the mount, and are looped about a pair of protrusions on the back of the mount. The bands of this reference are flexible and removable in order to prevent breakage of the thermometer and allow removal of the thermometer from the backing, respectively.

Another example from the prior art is U.S. Pat. No. 2,276,001 (Tebben) wherein the thermometer is fastened to the elongated backing by clips. These clips are inflexible and only serve to secure the thermometer to the backing.

Although examples of mounted thermometers exist in the prior art several disadvantages are present. Many of them do not provide any resistance to breakage thereby leading to a large number of broken thermometers as a result of normal use and handling. Others have structural disadvantages which make them susceptible to weathering and difficult to mount in convenient locations.

OBJECTS OF THE INVENTION

The primary object of the invention is to aid in preventing a thermometer tube from breaking due to the everyday stresses and strains to which it is exposed.

A further related object of the invention is to allow the elongated backing to be bent in either direction when placing the thermometer on a window or other hard surface, without breaking the thermometer.

Another object of the present invention is to allow the thermometer to withstand the shock of impact caused by dropping, handling or shipping the thermometer.

Yet another object of the present invention is to prevent the thermometer from coming loose from the elongated backing with the expansion or contraction of the backing due to heating or cooling.

A still further object of the present invention is to provide a fastening device that exhibits excellent resistance to the outdoor environment.

SUMMARY OF THE INVENTION

These and other objections of the invention are obtained by:
an indoor-outdoor thermometer comprising:
an elongated backing having a front surface and a rear surface,
a temperature scale disposed on said front surface,
a first opening in said backing located at one end of said temperature scale,
a second opening in said backing located at the other end of said temperature scale,
a first protruding member integral with and extending from said backing into said first opening in the same plane as said backing,
a second protruding member integral with and extending from said backing into said second opening in the same plane as said backing, and
means for fastening a thermometer tube on said backing comprising,
two elastomeric rings one looped around each of said protruding members and both looped around said thermometer tube.

BRIEF DESCRIPTION OF THE DRAWINGS

The invention will be better understood by reference to the following description and drawings wherein.

DETAILED DESCRIPTION OF THE PREFERRED EMBODIMENT

Figure 1:
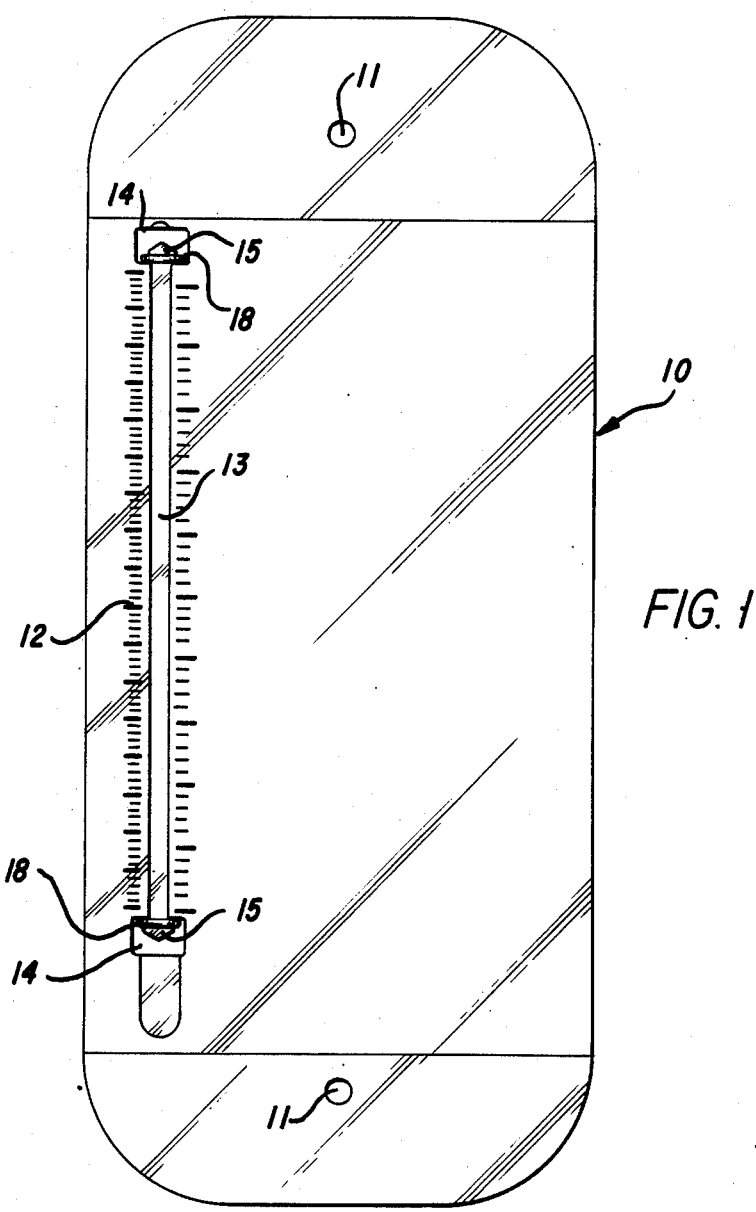
FIG. 1 is a front view of the elongated backing with the thermometer affixed thereon.
Figure 3:
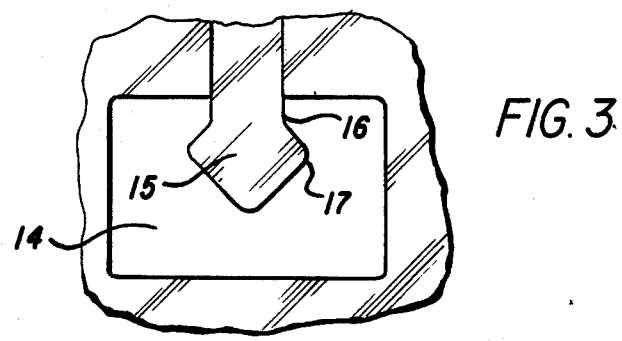
FIG. 3 is a front view of one of the openings in the backing without the mounted thermometer present and showing the protruding member.
Figure 2:
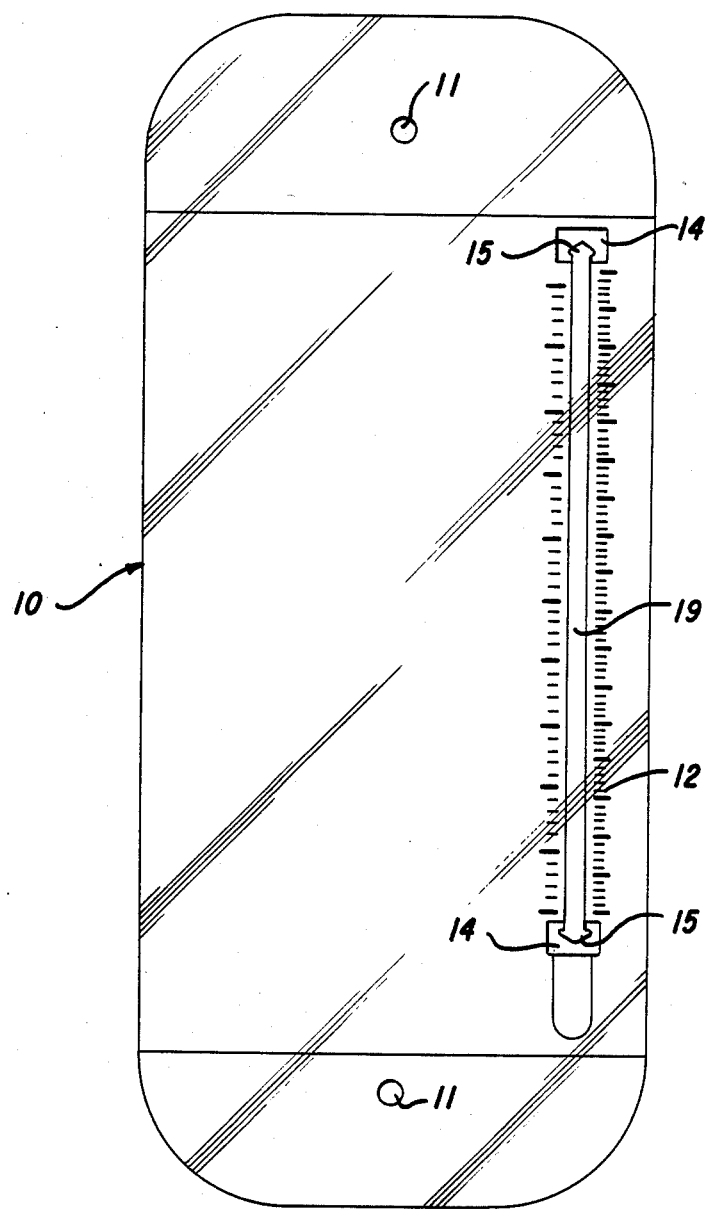
FIG. 2 is a rear view of the elongated backing without the thermometer affixed to the front surface.

The foregoing and other objects and advantages of the present invention will be understood more fully from the following detailed description.

As shown in the drawings the present invention includes an elongated backing 10 on which is mounted a thermometer tube 13. The elongated backing 10 is preferably fabricated from a clear plastic material. The elongated backing 10 is also preferably slightly flexible so as to facilitate mounting of the thermometer tube. However, excessive flexibility of the backing such that it will bend more than a few degrees, is normally avoided because it increases the tendency to break the thermometer upon flexing of the backing.

The elongated backing 10 includes two holes 11 which may be used to mount the elongated backing 10 to a surface by any suitable means. Referring to FIG. 1, the front surface of the elongated backing 10 is provided with a temperature scale 12. This temperature scale 12 is calibrated to correspond with the expansion and contraction of the fluid in the thermometer tube 13. Also, underneath the thermometer tube 13 there exists a depression 19 in the elongated backing 10 running the length of the temperature scale 12. The thermometer tube 13 is mounted in this depression 19 for greater stability on the elongated backing 10.

The elongated backing 10 also has two openings 14 located at either end of the temperature scale 12. These openings 14 are generally rectangular in shape although any opening of the appropriate size is acceptable. Protruding into the openings 14 in the elongated backing member 10 are two protruding members 15, one in each opening 14. These protruding members 15 are merely extensions of the elongated backing 10 such that the protruding members 15 are in the same plane as the elongated backing 10. The protruding members 15 are composed of the same material as the elongated backing member 10. These protruding members 15 are preferably shaped such that there is a thin neck portion 16 and a wider flanged head portion 17, and the protruding members 15 are preferably parallel to the thermometer tube 13. The neck portion 16 extends into the opening 15 a distance greater than or equal to the width of the elastomeric rings 18. In the preferred embodiment the neck portion 16 extends a distance equal to the width of the elastomeric rings 18.

A pair of elastomeric rings 18 encircle the thermometer tube 13 at either end of the thermometer tube 13. These rings 18 are looped around the neck portion 16 of the protruding members 15 in order to fasten the thermometer tube 13 to the elongated backing 10. The flanged head portion 17 serves to secure the elastomeric rings 18 into the neck portion 16. The elastomeric rings 18 are composed of a somewhat flexible material such as neoprene, that will allow the thermometer tube 13 to move a short distance outwardly from the elongated backing 10 without breaking when the elongated backing 10 is bent in either direction. Further, the flexibility of the elastomeric rings 18 will cause them to absorb shock from shipping, handling and dropping of the thermometer tube 13 while it is mounted on the elongated backing 10. Yet another advantage of the elastomeric rings 18 is that it will not rust, it is resistant to weathering, and it can retain its properties over large temperature ranges.

The overall design of the fastening means of the present invention allows for removal of the thermometer tube 13 from the elongated backing 10 if this is desired.

In addition, the rear surface of the elongated backing 10 is completely flat with the exception of the protrusion of the two elastomeric rings 18 therefrom. Since this protrusion is minimal the present invention may be mounted directly onto a flat surface. Further, the short length of the elastomeric rings 18 of the present invention make them relatively inconspicious such that they do not impair the function of the invention by obstructing the view of the thermometer tube 13.

It should be understood that the foregoing description is intended merely to illustrate the vention and that other embodiments and modifications will be apparent to those skilled in the art, without departing from the spirit of the invention.

I claim:

1. An indoor-outdoor thermometer comprising:
   an elongated backing having a front surface and a rear surface,
   a temperature scale disposed on said front surface,
   a first opening in said backing located at one end of said temperature scale,
   a second opening in said backing located at the other end of said temperature scale,
   a first protruding member integral with and extending from said backing into said first opening in the same plane as said backing,
   a second protruding member integral with and extending from said backing into said second opening in the same plane as said backing,
   a thermometer tube and means for fastening said thermometer tube on said backing comprising a first elastomeric ring looped around said first protruding member and one end of said thermometer tube and a second elastomeric ring looped around said second protruding member and the other end of said thermometer tube.

2. Apparatus in accordance with claim 1 wherein said protruding members are composed of a flanged head portion and a neck portion; and
   said neck portion extend from said backing a distance greater than or equal to the thickness of said elastomeric rings.

3. Apparatus in accordance with claim 2 wherein said neck portion of said protruding member extends from said backing a distance equal to the thickness of said elastomeric rings.

4. Apparatus in accordance with claim 1 wherein said backing is composed of a flexible plastic material.

5. Apparatus in accordance with claim 1 further comprising a depression in said elongated backing extending the length of said thermometer tube.

6. Apparatus in accordance with claim 1 wherein said elastomeric rings are composed of neoprene.

7. Apparatus in accordance with claim 1 wherein said protruding members are parallel to said thermometer tube.

* * * * *